(12) United States Patent
Bunn, III

(10) Patent No.: US 6,328,660 B1
(45) Date of Patent: Dec. 11, 2001

(54) METHOD FOR CLUB FITTING

(76) Inventor: Julian W. Bunn, III, P.O. Box 6008, Raleigh, NC (US) 27628

( * ) Notice: Subject to any disclaimer, the term of this patent is extended or adjusted under 35 U.S.C. 154(b) by 0 days.

(21) Appl. No.: 09/259,354

(22) Filed: Mar. 1, 1999

(51) Int. Cl.⁷ .......................... A67B 53/06; A67B 53/16; A67B 69/36
(52) U.S. Cl. .......................... 473/257; 473/287; 473/289; 473/292; 473/409
(58) Field of Search .................... 473/287, 289, 473/292, 409, 257

(56) References Cited

U.S. PATENT DOCUMENTS

| | | | | |
|---|---|---|---|---|
| 4,375,887 | * | 3/1983 | Lynch | 273/32 H |
| 5,040,279 | * | 8/1991 | Braly | 29/407 |
| 5,163,681 | * | 11/1992 | Hodgetts | 273/77 A |
| 5,351,951 | * | 10/1994 | Hodgetts | 273/77 A |
| 5,351,952 | * | 10/1994 | Hackman | 273/77 A |
| 5,379,641 | * | 1/1995 | Paasivaara | 73/579 |
| 5,441,256 | * | 8/1995 | Hackman | 273/77 |
| 5,478,073 | * | 12/1995 | Hackman | 273/77 A |
| 5,591,091 | * | 1/1997 | Hackman | 473/289 |
| 5,722,899 | * | 3/1998 | Cheng | 473/289 |
| 5,772,522 | * | 6/1998 | Nesbit | 473/222 |
| 5,792,000 | * | 8/1998 | Webber | 473/223 |
| 5,821,417 | * | 10/1998 | Naruo | 73/491 |

* cited by examiner

Primary Examiner—Lee Young
Assistant Examiner—Paul D Kim
(74) Attorney, Agent, or Firm—Coates & Bennett, P.L.L.C.

(57) ABSTRACT

A system and method for fitting a golfer with one or more golf clubs. The system or method comprises measuring one or more swing characteristics of a golfer and selecting a swing coefficient that is a function of one or more measured swing characteristics of the golfer. Thereafter fitting the golfer with one or more golf clubs based on a correlation between the swing coefficient and the natural frequency of the golf club selected.

30 Claims, 2 Drawing Sheets

METHOD FOR CLUB FITTING

FIELD OF THE INVENTION

The present invention relates to systems and methods for fitting a golfer with one or more golf clubs, and more particularly to a system and method that entails measuring one or more swing characteristics of a golfer and utilizing those swing characteristics to select one or more golf clubs with a natural frequency that is determined to be an optimum frequency for the golfer.

BACKGROUND OF THE INVENTION

For many years now, there have been attempts at fitting a golfer with a golf club or set of golf clubs with the idea that golf clubs of a certain characteristic are more suitable for a particular golfer than others. A number of factors have been considered in fitting a golfer with golf clubs. One factor that has been used and considered in this process is the stiffness of the golf club. It has been recognized that the stiffness of a golf club should vary depending upon a number of factors peculiar to the golfer. For example, it is widely accepted that a more flexible shaft is appropriate for a golfer that generates a relatively low club head speed. By the same token, it is appreciated that a stiffer club would under ordinary conditions be more appropriate for a person that generates a relatively high club head speed.

Even with those guidelines, it has still been difficult for retailers, pro shops, and professionals in the golf industry to appropriately fit golfers with golf clubs. One of the problems has been the lack of any standardization in the industry that scientifically and with precision provides guidance in fitting a golfer with a particular set of golf clubs. While the stiffness or the flexibility of a golf club is important in the fitting process, the lack of a stiffness or flexibility standardization has hampered professionals from being very effective in fitting golf clubs with precision. For example, in the golf industry the stiffness of the shaft is generally seen as following within one of five categories: extra stiff, stiff, regular, seniors, and ladies. However, these categories do not align or correlate between different manufacturers. That is, a stiff club produced by one manufacturer may be equivalent to a regular club produced by a second manufacturer. Therefore, by simply determining that a "stiff" or "regular" club would be appropriate for a golfer can be rather meaningless.

It is known to provide more scientific principles in the actual manufacturing of golf clubs, as opposed to fitting golf clubs to a particular golfer. In the case of manufacturing golf clubs, it has been known to provide for various degrees of stiffness based on a range of swing characteristics or conditions. For example, see the disclosures found in U.S. Pat. Nos. 4,122,593; 4,070,022; and 4,736,093.

While there have been attempts at devising systems and processes for fitting a golfer with golf clubs, the past approaches have been imprecise, difficult to effectively use, and in the end, have failed to properly match golfers with golf clubs based on sound rational and scientific principles. Thus, there is and continues to be a need for such a system and process.

SUMMARY OF THE INVENTION

The present invention entails a system and method for fitting a golfer with one or more golf clubs that is based on sound and rational principles. Accordingly, the present invention entails measuring one or more swing characteristics of a golfer and utilizing that measured swing characteristic to arrive at a swing coefficient for the golfer. In one embodiment of the present invention, the swing characteristics measured and analyzed include club head speed and/or club head load which happens to be the load placed on the golf club head at the conclusion of the back swing and just prior to the golfer moving downwardly through his or her swing. The swing coefficients are correlated to a range of golf club natural frequencies and club lengths for golf clubs. Given that a golfer is seeking a club of a particular length, for example an 8-iron or a 9-iron, then by looking at the correlation between swing coefficient and natural frequency, one can select a golf club with a natural frequency that is deemed appropriate or suitable for the golfer.

Once a natural frequency has been determined for a particular golf club, then premanufactured clubs can be tested for natural frequency to determine a specific club that is appropriate for the golfer. In addition, golf clubs can be custom manufactured or retro-fitted to yield the ideal or targeted natural frequency. In any event, the golfer is fitted with one or more golf clubs that yield or possess a natural frequency that correlates to the swing coefficient of a particular golfer for any given club.

It is therefore an object of the present invention to provide a system or method for fitting a golfer with golf clubs that is based on objective standards.

A further object of the present invention is to provide a system and method for fitting a golfer with golf clubs wherein the method or process is based on scientific criteria that identifies golf clubs that are appropriately suited for a specific golfer and which at least approximates an optimum club or set of clubs for the golfer.

Other objects and advantages of the present invention will become apparent and obvious from a study of the following description and the accompanying drawings which are merely illustrative of such invention.

DETAILED DESCRIPTION OF THE INVENTION

Figure 1:
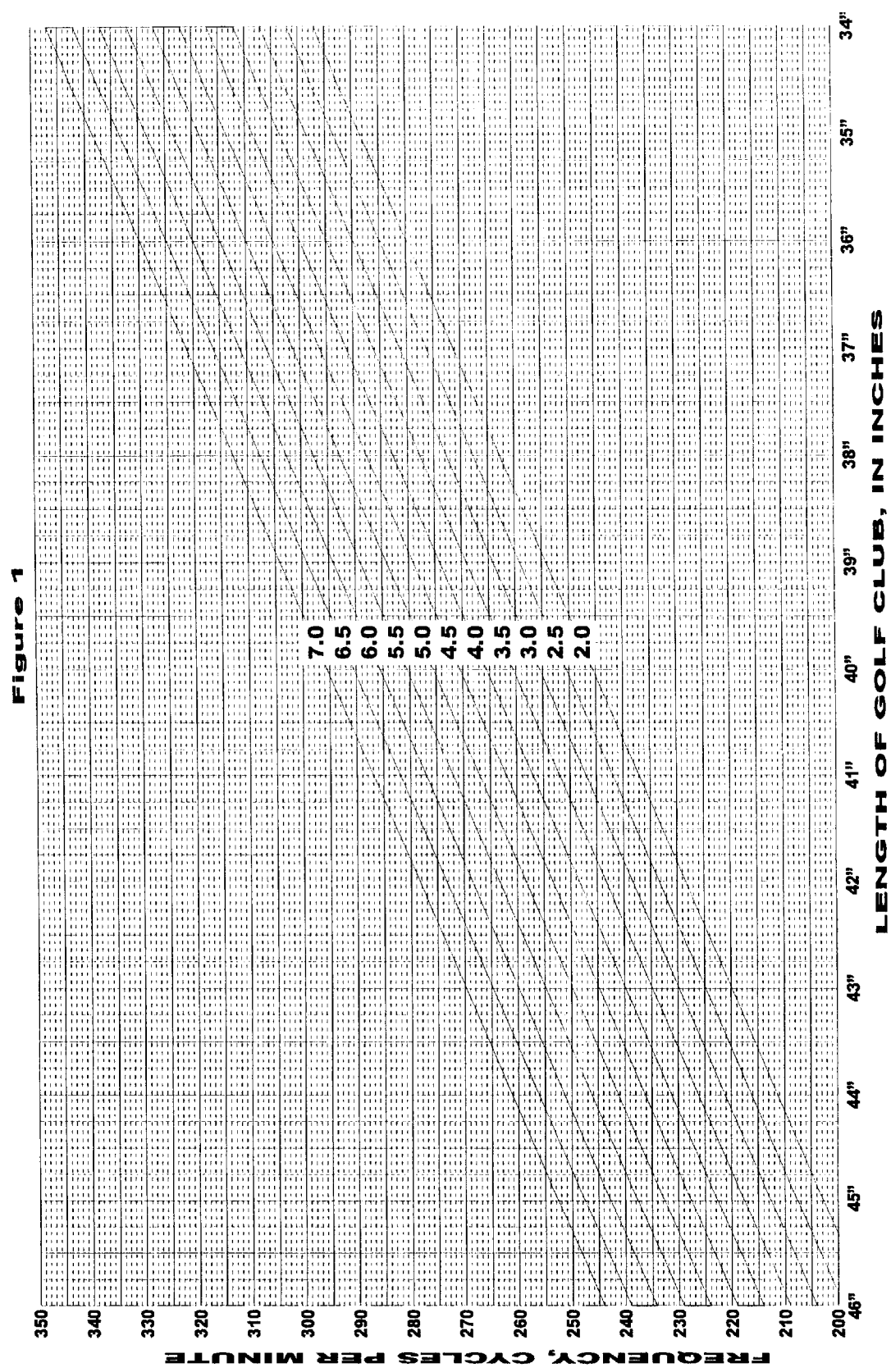
FIG. 1 is a graphic illustration showing swing coefficient as a function of club frequency and club length.

The present invention entails a system and method that permits a golfer to be matched with one or more golf clubs that is compatible with the golfer's swing. More particularly, the present invention entails establishing criteria related to swing characteristics and correlating those swing characteristics to a range of swing coefficients that in the end are used to identify and determine optimal characteristics of a golf club. In the embodiment disclosed herein, two main swing characteristics are utilized: (1) club head speed and (2) club head load. Club head speed refers to the speed of the club head just prior to impact during a normal swing. The shaft load characteristic referred to is a measure of the load placed on the shaft at the top of a normal swing just prior to the golfer executing the down swing. Expressed in another way, the load is a measure of the force placed on the shaft at the transition between the back swing and the down swing. Just prior to the golfer executing the down swing, it is common for the shaft to flex and in the course of flexing the load being identified here is placed on the shaft. Other swing characteristics can be employed in order to determine a swing coefficient for a golfer. For example, one other swing characteristic maybe the elapsed time of the swing. That is, the time from the start of the swing to impact is measured. This can be integrated with other swing characteristics such as club head speed and load factor to arrive at a swing coefficient.

There are numerous conventional ways to measure club head speed and club head load which is referred to herein as the load index or load factor. For example, there is available commercially, instrumentation that can be utilized to measure the club head speed of a golf club during the course of a swing. For example, Miya, Inc. produces such an instrument sold under the name "Speed Meter". In addition, there are devices that can be attached to the club head to measure the load index or load factor described above. One such device is manufactured by True Temper, Inc. and is referred to as the "Determinator".

In table 1 appearing below, the swing characteristics, club head speed and load index or load factor are set forth and are correlated with a range of swing coefficients. Note that the club head speeds vary from 60 mph to 125 mph. Also the load index or load factor varies from 4 to 26. In developing this system and process, a range of load factors have been matched with a particular club head speed. This is based on the conclusion that under normal conditions, that for each club head speed or range of speeds there is a general range of loads that are developed by average golfers. Therefore, there is some natural correlation between club head speed and the load factor.

Once the swing characteristics have been grouped, then a range of swing coefficients are uniformly distributed over the range of swing characteristic. The swing coefficients therefore serve to identify a range of swing characteristics that a universe of golfers would inherently possess.

coefficients, table I shows club head speed varying from 60 mph to 125 mph while the load index or load factor varies from 4 to 26.

Table I serves as a reference that is used in fitting a golfer with one or more golf clubs. Procedurally, the golfer is examined and evaluated for certain swing characteristics. In the case of this embodiment, a test is conducted to determine the golfer's normal club head speed. In determining this, it is suggested that the golfer, after appropriately warming up, make five separate swings with a standardized club and in each case, a club head speed reading is taken. These are averaged and the average club head speed is established for the golfer. Next, a load factor test is conducted on the golfer. By using a conventional device used to measure load factor, the load or load factor applied to the club head just after reaching a full back swing position is determined. Now two swing characteristics of the golfer are known, club head speed and load factor. From this information, one goes to table I and determines the swing coefficient for that golfer. In the case of table I, there are intervals between the club head speed readings. Thus if a golfer's club head speed falls between two readings, which it will from time to time, then the closest club head speed is selected from the reference, which in this case is table I. Opposite the selected club head speed is a load factor index which comprises a range of load factors. If the golfer's load factor falls squarely within that range, then the corresponding swing coefficient is selected. There are cases where the golfer's load factor will fall outside of the corresponding range. In this case, this means that the swing coefficient must be adjusted up or down. In this embodiment, it is contemplated that the swing coefficient will be adjusted up and down a value of 0.1 for each unit (1) of variance from the noted load factor. Adjustment of the swing coefficient should be limited. In this embodiment of the invention, it is contemplated that swing coefficient will never be adjusted up and down more than 0.4.

TABLE I

SWING CHARACTERISTIC–SWING COEFFICIENT CORRELATION

| CLUBHEAD SPEED (MPH) | LOAD INDEX | SWING COEFFICIENT | CLUBHEAD SPEED (MPH) | LOAD INDEX | SWING COEFFICIENT |
| --- | --- | --- | --- | --- | --- |
| 125.0 | 20–26 | 7.0 | 92.5 | 12–18 | 4.5 |
| 123.7 | 20–26 | 6.9 | 91.2 | 12–18 | 4.4 |
| 122.4 | 20–26 | 6.8 | 89.9 | 11–17 | 4.3 |
| 121.1 | 19–25 | 6.7 | 88.6 | 11–17 | 4.2 |
| 199.8 | 19–25 | 6.6 | 87.3 | 11–17 | 4.1 |
| 118.5 | 19–25 | 6.5 | 86.0 | 10–16 | 4.0 |
| 117.2 | 18–24 | 6.4 | 84.7 | 10–16 | 3.9 |
| 115.9 | 18–24 | 6.3 | 83.4 | 10–16 | 3.8 |
| 114.6 | 18–24 | 6.2 | 82.1 | 9–15 | 3.7 |
| 113.3 | 17–23 | 6.1 | 80.8 | 9–15 | 3.6 |
| 112.0 | 17–23 | 6.0 | 79.5 | 9–15 | 3.5 |
| 110.7 | 17–23 | 5.9 | 78.2 | 8–14 | 3.4 |
| 109.4 | 16–22 | 5.8 | 76.9 | 8–14 | 3.3 |
| 108.1 | 16–22 | 5.7 | 75.6 | 8–14 | 3.2 |
| 106.8 | 16–22 | 5.6 | 74.3 | 7–13 | 3.1 |
| 105.5 | 15–21 | 5.5 | 73.0 | 7–13 | 3.0 |
| 104.2 | 15–21 | 5.4 | 71.7 | 7–13 | 2.9 |
| 102.9 | 15–21 | 5.3 | 70.4 | 6–12 | 2.8 |
| 101.6 | 14–20 | 5.2 | 69.1 | 6–12 | 2.7 |
| 100.3 | 14–20 | 5.1 | 67.8 | 6–12 | 2.6 |
| 99.0 | 14–20 | 5.0 | 66.5 | 5–11 | 2.5 |
| 97.7 | 13–19 | 4.9 | 65.2 | 5–11 | 2.4 |
| 96.4 | 13–19 | 4.8 | 63.9 | 5–11 | 2.3 |
| 95.1 | 13–19 | 4.7 | 62.6 | 4–10 | 2.2 |
| 93.8 | 12–18 | 4.6 | 61.3 | 4–10 | 2.1 |
| 92.5 | 12–18 | 4.5 | 60.0 | 4–10 | 2.0 |

From the above table, it is seen that the swing coefficients range from 2.0 to 7.0. Within that range of swing To appreciate the calculation of swing coefficient, consider this example. A golfer has an average club head speed of 95.0 mph and an average load factor of 22. This would yield a swing coefficient of 5.0. This is because one starts with a swing coefficient of 4.7 and that is adjusted upwardly 0.3 since the load factor 22 exceeds the normal range set forth in Table I by 3 units.

After the swing coefficient for the golfer has been determined, the next step in the procedure entails selecting a golf club or a set of golf clubs that are appropriately matched to the golfer based on his or her swing coefficient. In fitting a club to a golfer, the stiffness or flexibility of the shaft of the golf club is an important consideration. The stiffness or flexibility of a golf club is generally viewed in terms of the natural frequency of the club which is expressed in cycles per minute. Generally, the stiffer the golf shaft, the greater the natural frequency. Therefore, it is contemplated that based on table I and accepted correlations between the stiffness of a golf club and a golfer's ability as reflected by his or her swing characteristics, that a golfer having a greater club head speed and a correlating load factor will generally require a shaft having a greater natural frequency.

Turning to FIG. 1, there is provided a graphic illustration that correlates the swing coefficients set forth in table I with both natural frequency and length of golf club. Note that for any given length of club, that the natural frequency, cycles per minutes, increases as the swing coefficient increases. Also, as the length of the golf club decreases, the correlated natural frequency for a given swing coefficient increases.

With reference to FIG. 1, assume that the determined swing coefficient for a particular golfer is 5.0. If that golfer desires a 40-inch club then it follows that the matched natural frequency for that particular club is 275 cpm. Consider a swing coefficient of 2.5 and the desire to match a 43-inch club. A 2.5 swing coefficient for a 43-inch club yields a matched natural frequency of 225 cpm. Therefore, it is appreciated that once a golfer's swing coefficient is determined, that by consulting the reference of FIG. 1, the natural frequencies for a variety of clubs can be determined.

Figure 2:
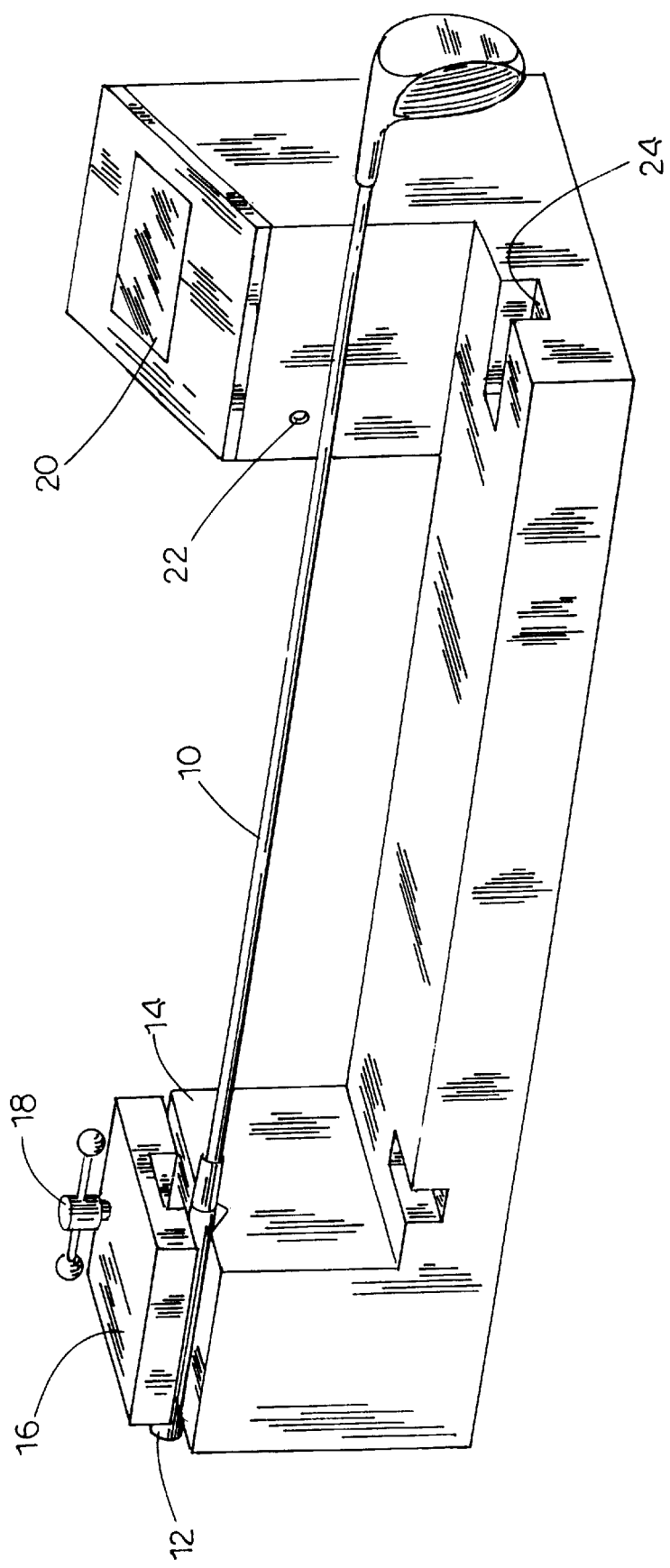
FIG. 2 is a perspective view of a frequency analyzer for determining the natural frequency of a golf club.

Once the natural frequency for a particular club or a set of clubs has been determined, then a club or set of clubs can be selected that possess the appropriate natural frequencies determined by this method. In addition, these natural frequencies can be used to custom make one or more golf clubs that precisely yields the appropriate natural frequency. In the case of selecting from premanufactured golf clubs, the golfer may select a particular club and that club can be tested for its natural frequency to determine if its natural frequency is the same or approximates the matched natural frequency taken from FIG. 1. Devices and instrumentation for measuring the natural frequency of golf clubs are well known and commercial available. For example, a golf club frequency analyzer is shown in FIG. 2. Note that in use, the golf club 10 is supported about its grip end 12 within a notched block 14. A securing plate 16 is secured downwardly over the top of the grip end by an adjustment mechanism 18. This enables the golf club 10 to be supported in cantilever fashion such that the opposite end, the club head end, is free to be deflected and released such that it will cycle back and forth. The frequency analyzer is provided in conventional fashion with some means for measuring or counting the cycles per minute in response to this deflection. In the case of the example shown in FIG. 2, there is provided a light source 22 that is effective to count the cycles per minute (cpm) of the golf club shaft in response to the shaft being deflected and set in motion. This is accomplished by an operator taking his or her finger and deflecting the golf club 10 downwardly until the shaft portion rests in the stop 24 formed in the base of the analyzer. Once the finger is released, the shaft will oscillate up and down and during that process the frequency analyzer will determine the natural frequency (cpm) of this particular golf club. The golf club frequency analyzer includes an LCD readout 20 that displays the CPM (cycles per minute) after each frequency measurement. It is through this process that premanufactured clubs are measured for frequency to determine if the actual natural frequency of the selected clubs conform with the natural frequency called for by the swing coefficient of the golfer.

Besides utilizing the present system and method for selecting premanufactured clubs, the natural frequencies that this method yields can also be utilized in the custom manufacture of golf clubs. In a case where a golfer desires a custom set of golf clubs to be manufactured, the natural frequency for each of the clubs would be determined in the same manner as described above. To achieve a selected natural frequency, it is known that the natural frequency of a golf club shaft can be varied by selectively trimming one or both ends of the club. Therefore in the case of clubs to be made in accustom fashion, the natural frequency for any particular club can be determined from a reference, in this case FIG. 1, and thereafter one or both ends of the club can be selectively trimmed to yield the desired natural frequency. It should be pointed out that the procedure for precisely trimming one or both ends of the shaft does take into account the precise weight of the head to applied to that shaft. Thus considering the precise weight and the desired natural frequency, the golf club can be custom made to yield the natural frequency called for by the present method. Details of the precise process employed in custom manufacturing golf clubs to exhibit precision natural frequencies is well known and appreciated by those skilled in the art. That process is not per se material to the present invention. The present invention deals with a system and method for determining the optimum natural frequency for one or more characteristics.

From the foregoing specification and discussion, it is seen that the present invention entails a system for fitting a golfer with one or more golf clubs that is based on sound, rational and scientific criteria. In the end, the system and method of the present invention provides a standard which golf retailers, pro shops and professionals can use to fit one or more golf clubs to a golfer with precision.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

I claim:

1. A method of fitting a golfer with one of more golf clubs, comprising:
   a. testing the golfer for club head speed and load, and based on the test arriving at a club head speed factor and a load factor;
   b. determining a swing coefficient for the golfer from a reference that correlates a series of club head speed and load factors with a series of swing coefficients;
   c. based on the golfer's swing coefficient, selecting an appropriate golf club frequency for a particular length club from the reference that correlates the series of swing coefficients with a series of shaft frequencies and club lengths; and
   d. testing the frequency of one or more golf clubs or a particular length to determine if one or more golf clubs yields a frequency that approximates the appropriate frequency as defined by the swing coefficient.

2. The method of claim 1 wherein various club head speed and load factors are matched to the series of swing coefficients.

3. The method of claim 2 wherein the load factors are presented in groups with each of the load factor groups including a range of load factors.

4. The method of claim 1 including adjusting the swing coefficient in cases where the measured load factor varies from the load factor corresponding to the golfers measured club head speed.

5. The method of claim 1 wherein the reference that correlates the series of club head speed and load factors with the series of swing coefficients includes an array of different swing coefficients and with respective swing coefficients there is provided a corresponding club head speed and load factor.

6. The method of claim 5 wherein each load factor includes the range of load factors.

7. The method of claim 6 wherein determining the swing coefficient for a particular golfer, club head speed is considered as a preference over load factor.

8. The method of claim 7 wherein in determining the swing coefficient for the golfer, his or her measured club speed is used to first establish a starting point swing coefficient, and then that starting point swing coefficient may be adjusted when the golfer's load factor lies out of the load factor range that correlates with the golfer's club head speed.

9. The method of claim 8 wherein the swing coefficient is adjusted upwardly when the measured load factor is higher than the corresponding load factor range and wherein the swing coefficient is adjusted downwardly when the measured load factor is lower than the corresponding load factor.

10. The method of claim 1 wherein the reference correlating the swing coefficient with a series of golf club frequencies and club lengths includes a graphic illustration having x and y axes that represent club head frequency and club length and wherein there is provided a series of spaced apart lines that represent swing coefficients that extend diagonally with respect to the x and y axes.

11. The method of claim 1 including selecting a group of clubs for the golfer based on the golfer's swing coefficient.

12. The method of claim 1 wherein testing the frequency of one or more golf clubs includes mounting the golf club and initiating a frequency response and measuring a natural frequency of the golf club.

13. The method of claim 12 wherein the golf club includes a club head end portion and a grip end portion and wherein the golf club is mounted about its grip end portion and the club head end portion is deflected to set in motion the cycling of the golf club.

14. The method of claim 1 wherein elapsed time is also considered in determining the swing coefficient.

15. A method of fitting a golfer with one of more golf clubs, comprises:
  measuring one or more swing characteristics of the golfer, selecting a swing coefficient that is a function of the one or more measured swing characteristics of the golfer; and
  then fitting the golfer with one or more golf clubs based on a correlation between the swing coefficient and the natural frequency of the golf club.

16. The method of claim 15 including correlating a series of swing coefficients with a series of natural golf club frequencies and testing one or more golf clubs for natural frequency to determine if the frequency of the golf club matches the swing coefficient for the golfer.

17. The method of claim 15 wherein for a particular swing coefficient the correlating natural frequency varies depending upon the length of the golf club to be selected.

18. The method of claim 15 wherein measuring one or more swing characteristics of the golfer includes determining the club head speed of the golfer's swing.

19. The method of claim 18 wherein measuring one or more swing characteristics of the golfer includes measuring the load applied to a golf club by the golfer during the course of a swing.

20. The method of claim 19 including establishing a correlation between the range of club head speeds, the series of swing coefficients and various golf club lengths.

21. The method of claim 20 wherein the natural frequency of the golf club is tested by mounting an end portion of the club and deflecting the opposite end to set in motion a cycling action by the golf club.

22. The method of claim 18 including establishing a correlation between a range of club head speeds and a series of swing coefficients.

23. The method of claim 20 including testing the frequency of a particular golf club to determine if the natural frequency of that club matches the frequency called for by the golfer's swing coefficient.

24. The method of claim 15 wherein measuring one or more swing characteristics of the golfer includes determining the elapsed time of the golfer's swing.

25. A method of fitting one or more golf clubs to a golfer based on one or more swing characteristics of the golfer, comprising:
  a. measuring one or more swing characteristics of the golfer including measuring a golfer's club head speed and load that the golfer develops during a swing of a golf club;
  b. establishing a correlation between an array of club head speeds and an array of loads, and correlating those club head speeds and loads to a series of swing coefficients with respective swing coefficients being indicative of the club head speed and the load;
  c. correlating the series of swing coefficients to both a series of natural golf club frequencies and to a series of golf club lengths such that for a given swing coefficient and golf club length there is a corresponding golf club frequencies;
  d. determining the golfer's swing coefficient based on the measured club head speed and load developed in the golfer's swing; and
  e. fitting the golfer with one or more golf clubs that yield a frequency that corresponds to the swing coefficient and the length of the desired golf club.

26. The method of claim 25 wherein fitting the golfer with one or more golf clubs includes testing a potential golf club to determine if its natural frequency approximately corresponds with the natural frequency that corresponds with the golfer's swing coefficient for a particular length club.

27. A system for fitting a golfer with one or more golf clubs comprising: one or more references that correlate one or more swing characteristics with a swing coefficient wherein at least one of the swing characteristics includes a series of individual swing characteristic readings that are correlated with a series of swing coefficients such that by evaluating and determining the swing characteristic of the golfer, a corresponding swing coefficient for the golfer can be determined; and wherein the one or more references includes a correlation of golf club natural frequency and golf club length with the series of the swing coefficients such that by determining the swing coefficient of the golfer one can determine the appropriate natural frequency for a given golf club length for the golfer.

28. The system of claim 27 wherein the at least one reference includes an array of readings for at least two swing characteristics, club head speed and load factor.

29. The system of claim 28 wherein the series of club head speeds and load factors are matched so as to correspond with the series of swing coefficients, with each club head speed being matched with a load factor and wherein both club head speed and load factors are in turn correlated with a swing coefficient.

30. The system of claim 27 wherein there is provided at least two references, one reference correlating swing characteristic with swing coefficient while the second reference correlates golf club natural frequency and golf club length with swing coefficient.

* * * * *